United States Patent
Fu et al.

(10) Patent No.: US 9,172,917 B1
(45) Date of Patent: Oct. 27, 2015

(54) INTERNET PROTOCOL SECURITY CAMERA CONNECTED LIGHT BULB/SYSTEM

(71) Applicant: Kuna Systems Corporation, Millbrae, CA (US)

(72) Inventors: Sai-Wai Fu, Los Altos, CA (US); Haomiao Huang, Berkeley, CA (US)

(73) Assignee: Kuna Systems Corporation, Burlingame, CA (US)

( * ) Notice: Subject to any disclaimer, the term of this patent is extended or adjusted under 35 U.S.C. 154(b) by 44 days.

(21) Appl. No.: 13/921,597

(22) Filed: Jun. 19, 2013

Related U.S. Application Data

(60) Provisional application No. 61/684,310, filed on Aug. 17, 2012, provisional application No. 61/783,474, filed on Mar. 14, 2013, provisional application No. 61/790,865, filed on Mar. 15, 2013.

(51) Int. Cl.
*H04N 7/18* (2006.01)
*H04N 5/225* (2006.01)

(52) U.S. Cl.
CPC ............... *H04N 7/18* (2013.01); *H04N 5/2253* (2013.01); *H04N 5/2256* (2013.01)

(58) Field of Classification Search
CPC ... H04N 5/23203; H04N 7/18; H04N 5/2253; H04N 5/2256

USPC .......................... 348/207.1, 211.2, 216.1, 373
See application file for complete search history.

(56) References Cited

U.S. PATENT DOCUMENTS

| | | | |
|---|---|---|---|
| 2003/0197807 A1* | 10/2003 | Wu | 348/375 |
| 2003/0210340 A1* | 11/2003 | Romanowich | 348/272 |
| 2004/0207718 A1* | 10/2004 | Boyden et al. | 348/14.01 |
| 2008/0074256 A1* | 3/2008 | Hirai et al. | 340/541 |
| 2009/0015396 A1* | 1/2009 | Yeh et al. | 340/538.17 |
| 2010/0141153 A1* | 6/2010 | Recker et al. | 315/149 |
| 2012/0218421 A1* | 8/2012 | Chien | 348/207.1 |

* cited by examiner

*Primary Examiner* — Gevell Selby
(74) *Attorney, Agent, or Firm* — Christopher P. Maiorana, PC

(57) ABSTRACT

The present invention concerns an apparatus comprising an antenna module and a control module. The antenna module may be configured to connect and send data to a local network and a mobile handheld device through a wireless connection. The control module may be configured to provide (i) a physical connection to the antenna module, (ii) a power source to an external device, and (iii) a camera sensor to capture still and motion pictures and sounds of a surrounding environment of the apparatus. The pictures may be sent as the data through the wireless connection or through a mobile handheld device.

20 Claims, 9 Drawing Sheets

INTERNET PROTOCOL SECURITY CAMERA CONNECTED LIGHT BULB/SYSTEM

This application relates to U.S. Provisional Application No. 61/684,310, filed Aug. 17, 2012, U.S. Provisional Application No. 61/783,474, filed Mar. 14, 2013 and U.S. Provisional Application No. 61/790,865, filed Mar. 15, 2013, each of which are hereby incorporated by reference in their entirety.

FIELD OF THE INVENTION

The present invention relates to security cameras generally and, more particularly, to a method and/or apparatus for implementing an Internet Protocol security camera connected light bulb/system.

BACKGROUND OF THE INVENTION

Conventional light bulbs are passive devices with (at most) simple sensors (light or motion) to help turn the light bulb on or off. Basic Wi-Fi connected light bulbs allow users to control a light bulb from Wi-Fi connected devices. Such systems do not have signals from the light bulb to the users to help the users decide how to control the light bulb. Hence, the control functions would be limited to simple algorithms such as time-based on-off and random on-off timings.

Conventional security cameras need to access an electrical outlet for power. Such systems do not provide any solution if there is no electrical outlet. Often times, especially in an outdoor installation, electrical outlets are not available. Adding a new electrical outlet for a residential home or a small business can cost more in time and money than an average cost of security camera hardware.

Disadvantages with conventional systems are significant. A simple light bulb with one way communication cannot be intelligent. Another disadvantage of conventional security cameras is that they do not provide a solution when there is no power outlet.

It would be desirable to implement an IP (internet protocol) security camera connected light bulb to provide an intelligent light bulb/system with two way communication of sound and/or images that allow imaginative ways of controlling lighting with security features.

SUMMARY OF THE INVENTION

The present invention concerns an apparatus comprising an antenna module and a control module. The antenna module may be configured to connect and send data to a local network and a mobile handheld device through a wireless connection. The control module may be configured to provide (i) a physical connection to the antenna module, (ii) a power source to an external device, and (iii) a camera sensor to capture still and motion pictures and sounds of a surrounding environment of the apparatus. The pictures may be sent as the data through the wireless connection or through a mobile handheld device.

The objects, features and advantages of the present invention include providing a security camera that may (i) receive power from a socket of an outdoor light, (ii) provide a wireless connection to a computer network, (iii) be cost effective to implement and/or (iv) provide intelligent control to a light bulb/system.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
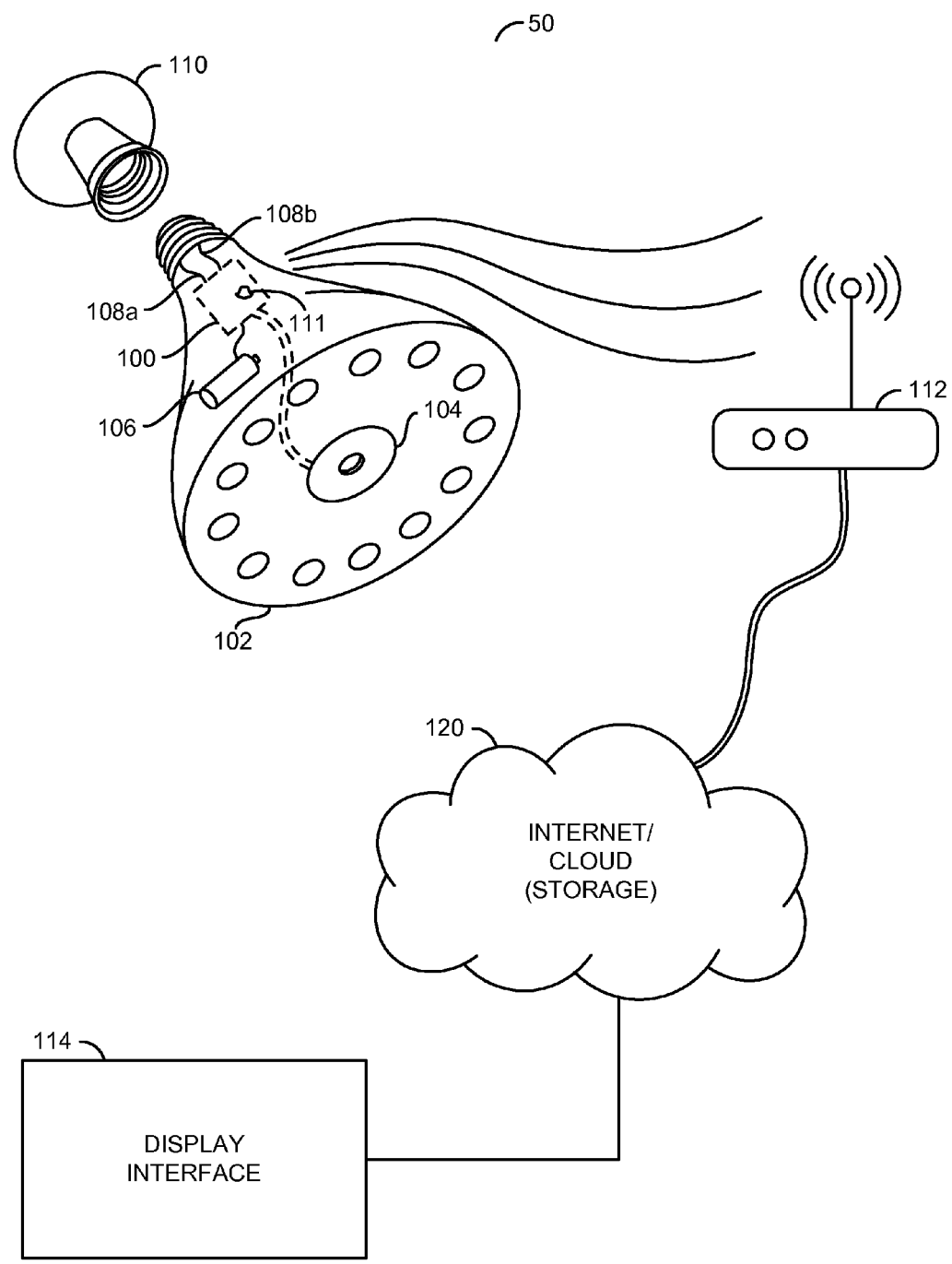
FIG. 1 is a diagram of an example embodiment of the invention.

Referring to FIG. 1, a block diagram of a system 50 is shown in accordance with a preferred embodiment of the present invention. The system 50 generally comprises a camera module and sensor (with or without a lens) 100, a bulb 102, a lens module 104, an optional battery 106 (since DC power is provided from the light bulb), a number of detachable power and/or control wires 108a-108b, a bendable and rigid pipe (to provide structural support of 100 and 104), a light bulb socket for all popular bases 110, an antenna 111, a Wi-Fi adapter/router 112, a phone, tablet, PC, or TV display interface 114, and a cloud storage and/or computation/analytic of images 120. The cloud storage 120 may be the Internet, a local area network, a Network Attached Storage (NAS) device, etc.

Figure 3:
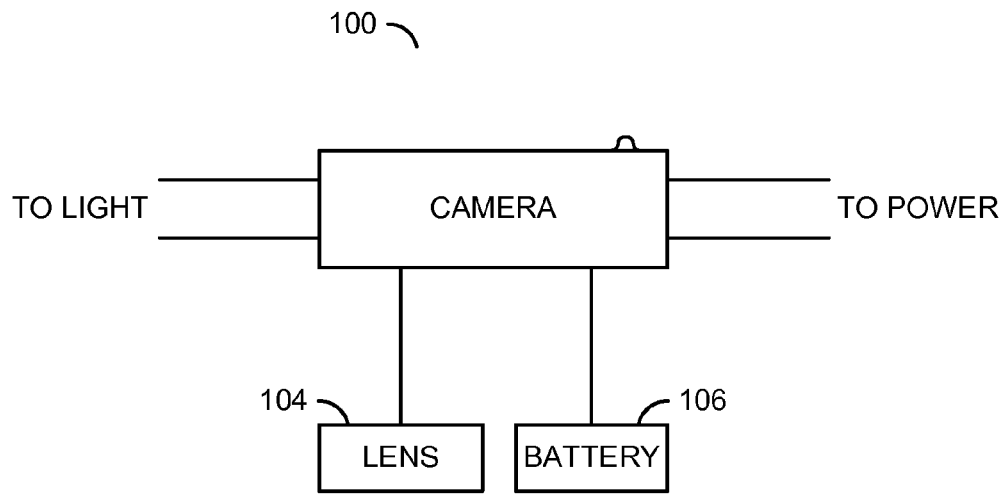
FIG. 3 is a more detailed diagram of the camera module.
Figure 4A:
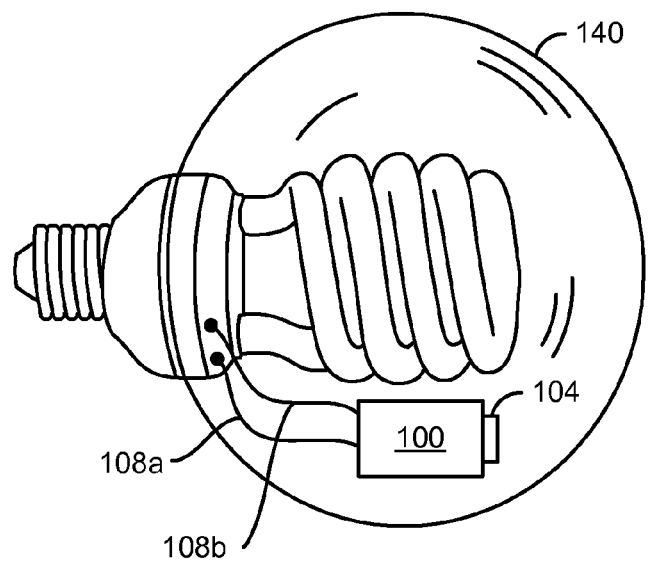
FIGS. 4A-4B are examples of the camera module including the housing of a lightbulb.
Figure 4B:
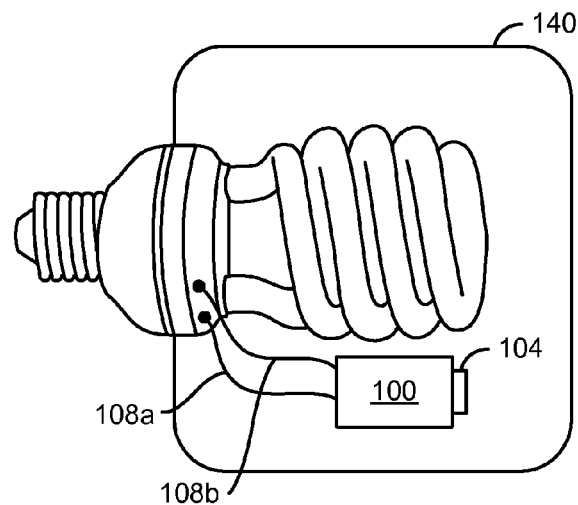

The connection between the lens sensor 104 and the camera 100 may be implemented as a number of wires (a standard interface for lens module to cell phone circuitry) that may run at high bandwidth, and usually very short distances (FIG. 3). The wires may be implemented in the same chassis as the camera 100. A speaker and/or microphone may be included in the lens 104. The camera 100 and/or lens 104 may be outside of a light shade 140 (FIGS. 4A-4B) if the shade 140 is opaque.

The camera module 100 may include a complete camera (e.g., without battery and display), but with the video circuitry, the antenna 111, a speaker and/or a microphone. The camera 100 may minimize manufacturing costs by maximizing the amount of circuitry that fits in the camera module 100. The camera 100 may fit in several different mounting configurations (e.g., with and without light bulb integration).

A number of configurations may be implemented (e.g., the circuit 100 being mounted inside the light bulb 102 and/or outside the light bulb 102). In one example, the camera circuit 100 may be mounted inside the light bulb 102 as a small circuit board. Circuitry inside the light bulb 102 may be used to control the intensity and/or color of the bulb 102. The camera circuit 100 may process either still pictures or video or sound captured from the lens 104.

The antenna 111 may be designed to fit inside the camera module 100. The antenna 111 may be implemented as a Wi-Fi antenna. In one example, a GoPro Wi-Fi backpack may be implemented, which is normally about 2 inches wide. In one example, the Wi-Fi frequency may be 2.5 Ghz, with ¼ wavelength of around 31 mm (e.g., 1.2 inches). A standard inexpensive omni-directional antenna 111 may be as simple as a wire of a 1.2 inch length and that may fit inside a small (e.g., a 1.5 inch diameter) camera module 100. To optimize the antenna 111 with higher gain, a cable (e.g., more than 3 inches) may be included as the antenna 111.

The control signals from the camera 100 to the light bulb 102 may include ON/OFF, intensity and/or color control. In one example, an array of LED lights may be implemented to provide changes in intensity and/or color. An array may be used to generate specific colors (e.g., white). Other colors may be implemented to meet the design criteria of a particular implementation.

Figure 5:
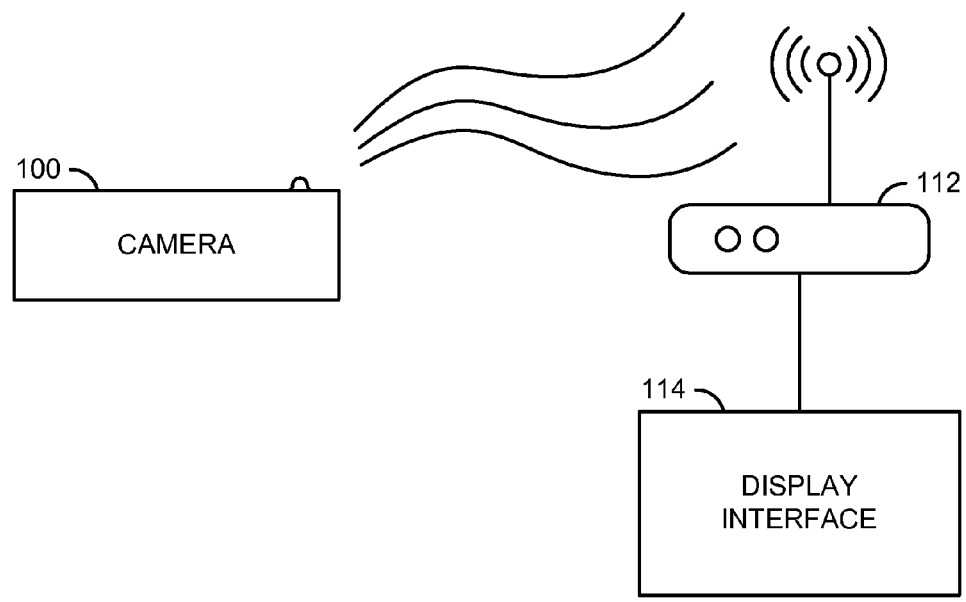
FIG. 5 is a diagram of an alternate implementation of the invention.
Figure 6:
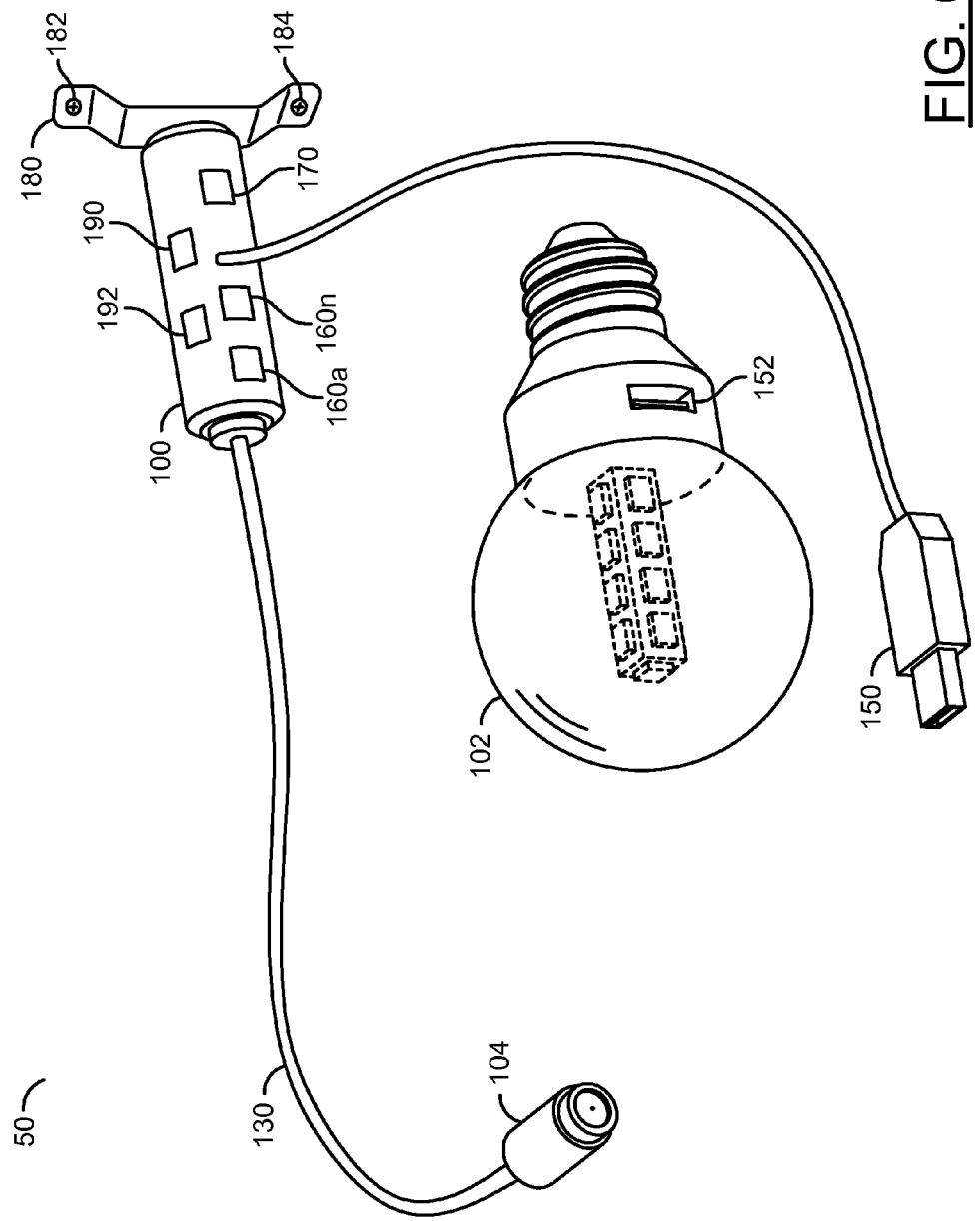
FIG. 6 is a diagram of a distributed implementation.

In FIG. 5, an example is shown where the camera 100 and the light bulb 102 are controlled by users without going through the cloud 120. A smartphone or tablet application may control the camera 100 and/or the light bulb 102, via Wi-Fi, bluetooth, etc. In one example, a voice command (or hand clapping) may be used to control the camera 100 and/or the light bulb 102 (although not likely for outdoor). In another example, a separate remote control may be implemented (e.g., Wi-Fi, bluetooth, IR, etc.).

The Wi-Fi antenna 111 may be included inside the camera 100, similar to other Wi-Fi connected devices. A very small Wi-Fi connected HD camera module (e.g., with a 1.5 inch diameter and 0.75 inch thickness) may attach to many different sockets/mounts for different uses and/or models. The light fixture 102 is just one of several mounts.

Figure 2:
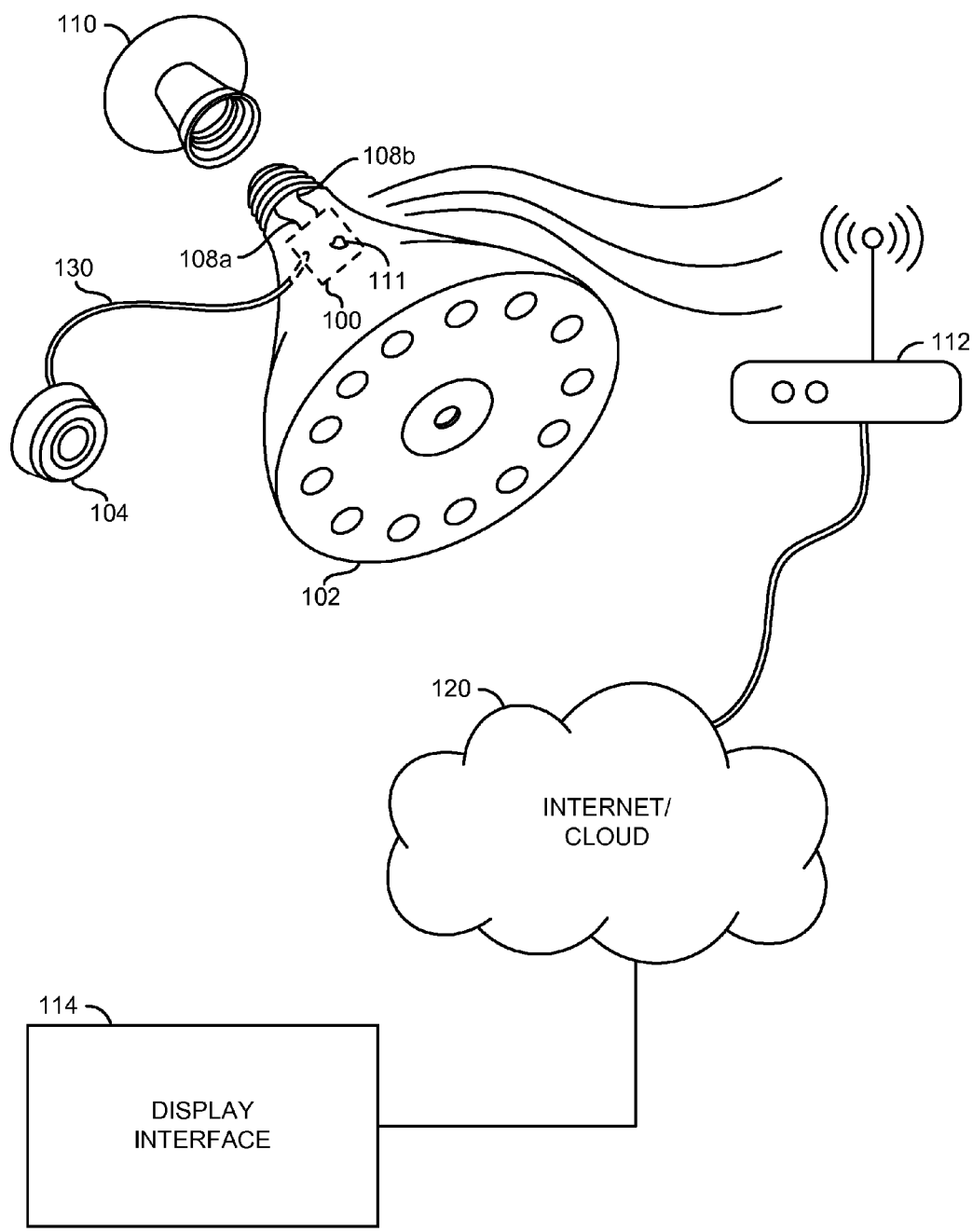
FIG. 2 is an alternate diagram of an example of the invention.

In one example, a cable 130 (see FIG. 2) may range from zero length (stealth, likely in front of the light bulb to avoid glare), to as much as 12 inches (or more) for positioning and/or aiming of the lens 104. The cable 130 may provide power, ground, and a control signal to turn the light bulb 102 on/off and change intensity and/or color. The lens 104 and/or the camera 100 may include all or part of the electronics needed. The particular camera features implemented in the lens 104 and/or the camera module 100 may be varied to meet the design criteria of a particular implementation. The cable 130 should be rigid and/or bendable.

In one example, the socket 110 may have 5 or more cable sockets (e.g., 4 sides and 1 at the front). The cable 130 may be removable from the bulb 102 and/or the camera 100. The cable 130 may be removable such that different lengths may be substituted to meet the design criteria of a particular implementation.

The camera 100 may be configured to take control of one or more of a number of light bulbs connected to a common power switch on the wall. A typical front door of a house usually has one or two light fixtures. Indoor lights often have multiple light bulbs controlled by one wall switch, especially ceiling lights. To control the other light bulbs without a camera, Wi-Fi connected light bulbs may be implemented. The wall switch controlling the receptacle is normally left "on" to power the electronics in the bulbs 102 and/or the camera 100.

The receptacle 110 may be varied to meet the design criteria of a particular implementation. The receptacle 110 may be designed to cover a variety of popular light bulb configurations with different bases (e.g., an A19 is the most popular). The system 50 may operate with LED bulbs and/or Compact Florescent bulbs and/or other types of bulbs (e.g., HID, etc.). The system 50 may operate with a high quality speaker (e.g., a 1.5 inch diameter) and/or a microphone module that may attach to or be integrated to the back of the camera 100.

The system 50 may be used to control an advanced light bulb (e.g., LED, CFL, etc.) by a miniature security camera circuit 100. The control functions may be automated by the signals received by the camera 100, or may be controlled manually by users with access to the images and/or sounds from the camera 100. A variety of Internet connected devices (such smart phones) may be used to control the system 50. The system 50 may provide an immediate benefit of providing electrical power to the camera 100 through the existing light fixture 110 where the light bulb 102 would fit. The additional benefits of controlling a light bulb 102 with images and/or sound from the camera 100 may become important as users learn about the possibilities.

The system 50 may solve several problems by integrating an advanced light bulb 102 (LED, CFC, etc.) with an advanced and/or miniature security camera 100. One problem solved is to provide true intelligence to a light bulb 102 when approached by a person and/or an animal. The light fixture 110 (e.g., in a residential home) is usually placed where strangers and/or animals will likely visit. When a stranger and/or an animal is detected by the security camera 100, an alert may be sent to the home owner. The home owner may instruct the light bulb 102 to operate in a friendly manner (e.g., low intensity and/or rhythmic) or in a hostile manner (e.g., high intensity and/or dissonant). In addition, a microphone and/or speaker of the security camera 100 may allow a home owner to enhance the communication through voice and/or sound. Another problem that the system 50 may solve is that the light fixture can provide power to the security camera through the integrated light bulb. In outdoor residential environment, there is usually no power outlet and/or home-owners generally do not like to run external power cords over the house walls.

In one example, all of the signals from a Wi-Fi connected light bulb and/or an Internet controlled security camera may be controlled by a PC or a web-service in the cloud or a web-based (or portable) computing device. For example, a PC software program may be used to control both the light bulb 102 and/or the security camera 100. In one example, such PC software may include a facial recognition module. Such a facial recognition module may be used to identify and/or sort out friendly people and/or animals from unfriendly people and/or animals. Friendly people may trigger certain sounds, while unfriendly people may trigger other sounds. In one example, an RFID detector module may be included on the camera module 100. Such an RFID detector module may identify whether a particular person is carrying an RFID transmitter that is identifiable by the camera 100. In such a case, an identified person may be presented with familiar lighting sounds. An unidentified person may receive unfriendly sounds (e.g., an alarm, etc.).

In one example, the camera module 100 may include storage for pre-recorded voice messages and/or music for playback that may depend on the particular image/sound/voice input received. For example, unwanted animals (e.g., raccoon, gofer, herons, etc.) may be detected and may be scared away by human voice or other predator voice. Other animals, like hummingbirds and/or squirrels, may be attracted by mating sounds. Another example may be a voice instruction for delivery personnel at front doors. In one example, such pre-recorded messages may be updated from the cloud storage 120 via Internet connection. Such images/sounds input may be processed and/or matched with images in the cloud-service and/or analysis may generate appropriate voice messages or music for playback. The latency in response must be minimized and managed. Such messages may be real time (live) from the user watching the image through internet connection. Such voice/music output may be replaced or combined by the algorithm/instruction to control the LED array intensity and/or color of the same light fixture. The system 50, with the camera module 100, may support conventional landscaping lighting fixtures (e.g., 12 volt DC light bulbs). The circuitry may be simpler if dedicated to a landscaping low voltage DC lighting fixture rather than to a traditional AC voltage. Alternatively, the circuitry may be made to support both traditional AC voltage (120 volt) and/or low voltage DC such as 12 volt.

In outdoor settings when there is no wireless internet network, the system 50 may use the camera 100 to control a light bulb, but may work with "ad hoc Wi-Fi network" supported by the camera and/or a hand-held device, such as a smartphone, tablet, etc. A sample usage model is to install an IP security camera with light bulb control in a place where there is no wireless internet network, and if needed, also install Wi-Fi controlled light bulbs that are connected to the same power switch. A user may then control the camera and the light bulbs with a hand-held device via ad hoc Wi-Fi or bluetooth wireless connection. The camera 100, with instruction from a user, may then proceed to control the light bulb 102 for visitors and/or visiting animals. An image captured by the camera 100 may be downloaded directly to a hand-held device which may later upload to the cloud storage 120. Alternatively, removable storage in the camera (e.g., memory cards) may be removed and inserted into a computer to upload the recorded content to the cloud storage 120.

The system 50 may provide two way communication circuitry in a light bulb, and/or power and/or signals from a light bulb to a miniaturized security camera. Application software may provide intelligence to a light bulb. Innovative placements of the camera 100 with respect to a high intensity light bulb in a closed environment may be used to avoid glare and/or provide optimal lighting to the camera 100.

The system 50 may provide value in the home security camera market. About half of the DIY (Do It Yourself) security camera market does not have an easy way to connect to a power outlet. The system 50 may save homeowners easily $200 in value by simplifying the installation process. The DIY security camera market is about 3 million units per year in the US and is predicted to grow to about 12 million units per year by 2016. With the system 50, about half of such units can save $200 per unit in installation cost, which translates to about $300M in 2012 and $1.2B in 2016.

The system 50 may also provide intelligence (e.g., communication, etc.) in the light bulb 102. The system 50 may allow users to communicate to strangers and/or animals in a creative way by combining lighting and/or sound with two-way signals.

Various electronics and/or capabilities may be included in the light fixture 110 adapter instead of in the light bulb 102. The advantage of such an installation is the compatibility with all types of light bulbs (e.g., LED light bulbs, etc.). The adapter 110 may provide a) DC voltage (e.g., 5 volts) for the camera and/or b) wireless communication (e.g., Wi-Fi, RF, etc.) and/or c) dimmer control circuitry.

The camera 100 may integrate various communication channels in hardware and/or software to provide various base-station capabilities of a security monitoring system. For example, Wi-Fi communication to a Wi-Fi router may enable communication with the Internet. In another example, an ad-hoc Wi-Fi communication with similar cameras or monitoring devices may be implemented. RF transceivers (e.g., FM channels around 315 MHZ, 433 MHZ, etc.) may be implemented to communicate with other monitoring devices such as smoke detectors, water sensors, thermostats, carbon-monoxide detectors, PIR motion detectors, key pads, sirens, etc. Cellular circuitry may be used to communicate with external cell towers. The cellular circuitry may enable communication with central security monitoring services and/or the Internet, as well as a backup channel if the Wi-Fi communication fails. A landline telephone communication channel may be implemented. A landline may enable low cost and/or redundant communication with a central security monitoring service.

The system 50 may augment vision with one or more sensors 160a-160n (e.g., IR, PIR, sonar, audio detection, doorbell sound, and/or doorbell signal) to improve the detection of a person. The sensors 160a-160n may be placed in the housing of the processor module 100 along with a speaker 170. Other modules may be placed nearby. The performance of the system 50 may be improved by placing the sensors 160a-160n in positions with better angles and/or by implementing more of the sensors 160a-160n to provide inputs to the processor module 100.

The camera/processor module 100 may include a bracket 180 to attach to a light fixture 110 via a mounting screw connecting the system 50 to the wall mounting fixture. A threaded neck of a security light may be connected to the wall mounting fixture 180. A removable nut at the top of a light fixture 110 may be implemented where the camera module 100 is connected to the light bulb 102 for power and/or control.

The system 50 may control the activation of security deterrence by implementing (i) harsh flashing of the light bulb 102, (ii) a loud siren, (iii) pepper spray, (iv) tear gas, or (v) other deterring actions and/or sounds. In one example, an automatic announcement may be implemented to deter tampering and/or theft of the system 50 by detecting close proximity of a person (e.g., a predetermined range, such as 2 feet, etc.). For example, a sample announcement such as "Do not tamper with this camera. Your pictures have been stored and may be uploaded to the appropriate authority" may be implemented.

In one example, an automatic announcement when a visitor is detected by the system 50 may be made. The announcement may provide time for the homeowner and/or trusted neighbors/friends to answer a phone call placed by the system 50. An example of such an announcement may be, "Hi, how can we help you? We are home but not expecting a visitor at this time."

In one example, the gooseneck camera 130 may be mounted to one of the mounting screws 182 and/or 184 of the light fixture 110. Such wall mounting screws are normally standard in most fixtures in the United States. The sensor module 104 may be mounted in the front. The sensor module 104 may be as small as 0.5 inches in diameter for HD video. For example, an implementation such as an "endoscopy inspection camera" may be used.

The processor module 100 may be located at the mounting end of a housing with the mounting screws 182 and/or 184 by using a micro-coax cable. In one example, the processor module 100 may be stored together with the sensor module 104 in the front in a large housing (e.g., 1.5 inch diameter, etc.). The interconnect to the light bulb 102 may be another wire that runs underneath the cap of the light fixture. Another configuration is to attach the processor module 100 at the back of the light fixture 110. If the processor 100 is mounted inside the light fixture, the need to separate out a Wi-Fi antenna 190 and/or keep the antenna 190 outside to avoid shielding problems from the light fixture may be minimized.

In one example, a selection of background sounds made by a strong human voice may be mixed in with the voice of the homeowner or trusted neighbors/friends when answering the phone call placed by the camera. Such background voices and/or noises may provide a deterring effect by appearing to a potential intruder that several people are home.

Figure 7:
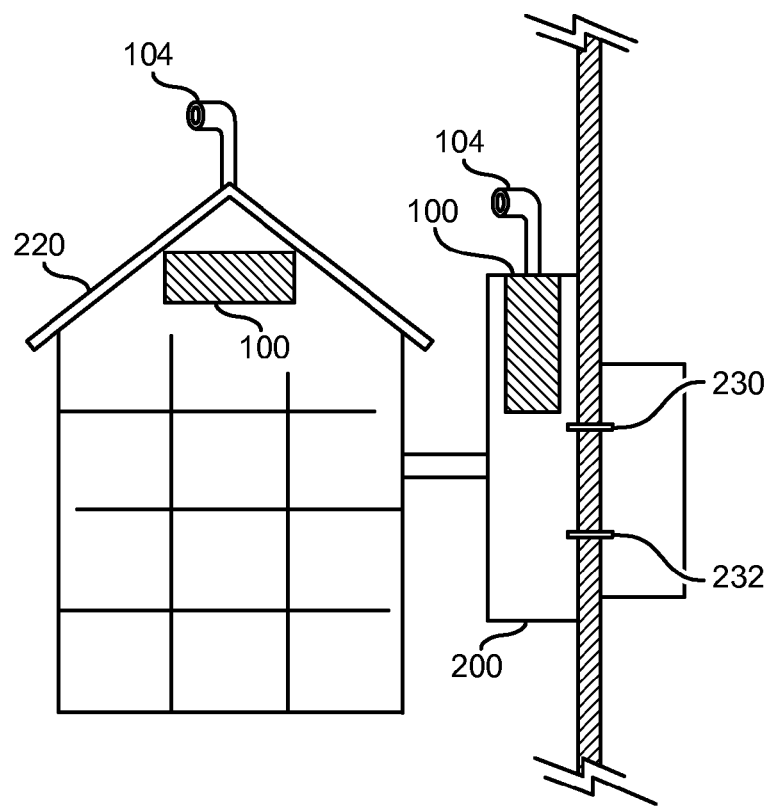
FIG. 7 is a diagram of an example installation.

Referring to FIG. 7, the system 50 is shown with the lens/sensor/processor 100 integrated into the light fixture 110 during manufacturing of the light fixture. FIG. 7 shows two different ways to integrate the apparatus 50 into a light fixture. The first implementation integrates into the light fixture wall mount base. The second implementation integrates inside the light fixture (e.g., on the top or somewhere in the bottom part of the light fixture). The lens/sensor module 100 generally needs some way to pass signals from the enclosure, which may be done with the telescoping gooseneck connection 130 that may support high speed interconnect to the control module 100. A Wi-Fi antenna may also be placed outside the enclosure for optimal range of communication. In addition, the audio speaker and/or microphone may be integrated in the light fixture or as a separate module.

An industrial design of the camera module 100 may be improved using such an integration process. For example, the speaker 170 and/or a microphone 192 may be separated as an option since the light fixture 110 is often mounted too high for two way intercom communication. In one example, two-way voice communication may be connected to the processor module 100 through wireless communication such as RF signals. Such two-way voice intercom may be placed close to a doorbell.

The apparatus 50 may include the camera control module 100, the camera lens/sensor 104, and an audio speaker/microphone intercom. The camera control module 100 may be located in a wall-mounted base 200. In an alternate embodiment, the control module 100 may be located in the roof of a building 220. The camera/lens sensor module 100 may be connected to the control module 100 with a telescopic gooseneck connector, typically through a high speed interconnect. The audio speaker/microphone intercom may be integrated into a light fixture, or may be implemented as a separate intercom module with the wireless communication. The system also includes securing brackets 230 and 232.

Figure 8:
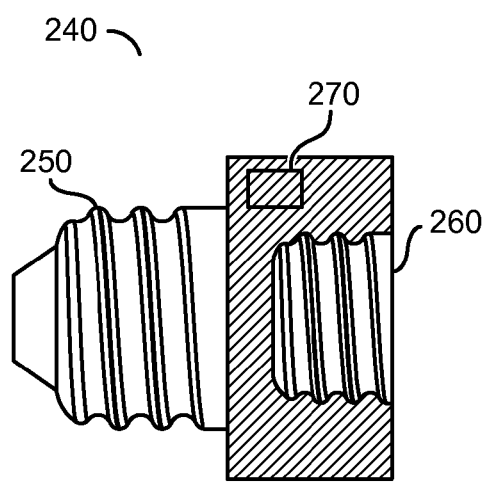
FIG. 8 is a diagram of an adapter.

Referring to FIG. 8, a DC power and control implementation is shown. FIG. 8 shows an adapter 240 that shows one end implemented as a standard A19 screw thread for the standard E26/E27 base socket. The other end is a smaller base, like E10 or E5. The adapter 240 provides a place to mount the electronics, DC power source and/or wireless communication interface. The adapter 240 may be implemented in a compact fashion. The adapter 240 may allow the apparatus 50 to be with standard light bulbs and to be implemented at a lower cost. The adapter 240 may support E5 to E27, as well as new bases (e.g., a GU24 base, etc.).

A screw end 250 may be compatible with an A19 type standard bulb fixture. A base 260 may be implemented to accept a smaller, more modern type of bulb, such as an E26/E27, or an E10 or E5 type fixture. A cavity 270 may be implemented to store the electronics module 100, a DC low voltage power supply, and/or a wireless communications module, etc.

The audio signal may be wirelessly transmitted to a separate audio intercom. In one example, a speaker and/or a microphone may be optionally powered by a battery. Such a configuration may be desirable to allow optimal placement of an audio communication and video recording and sensing.

Figure 9:
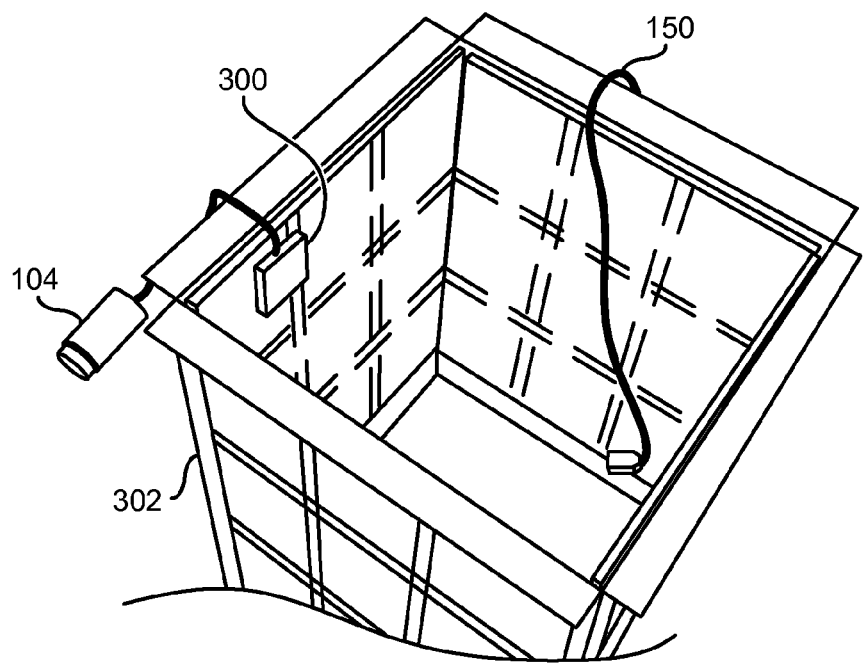
FIG. 9 is a diagram showing an example installation in an outdoor light.
Figure 10:
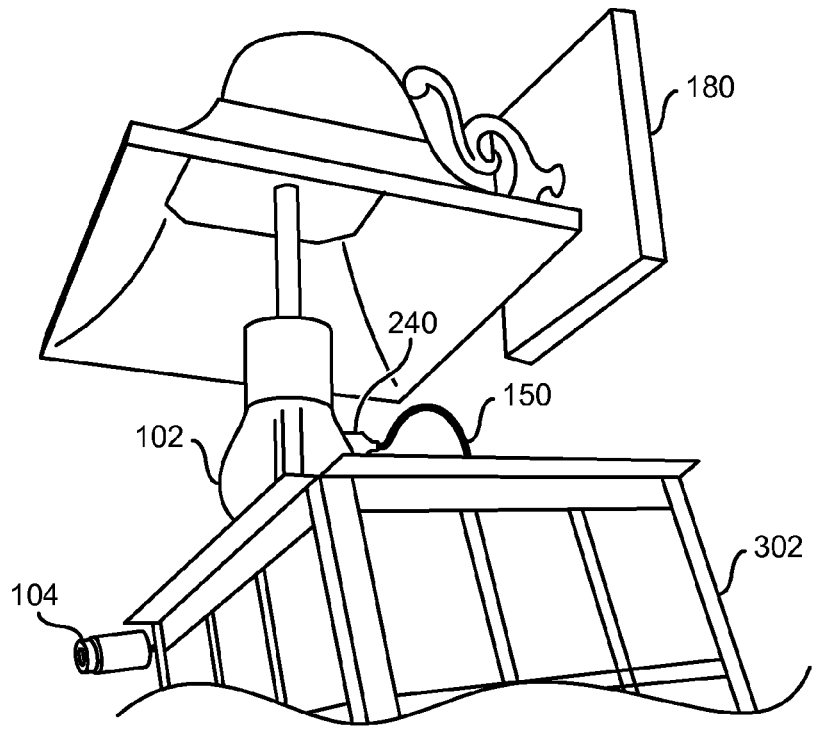
FIG. 10 is a more detailed diagram of the installation of FIG. 9.

Referring to FIGS. 9 and 10, an example mounting of the apparatus 50 in an outdoor light is shown. A connection piece 300 is shown. The connection piece 300 may be implemented, in one example, as an adhesive. In another example, the connection piece 300 may be a hook and loop fastener.

Figure 12:
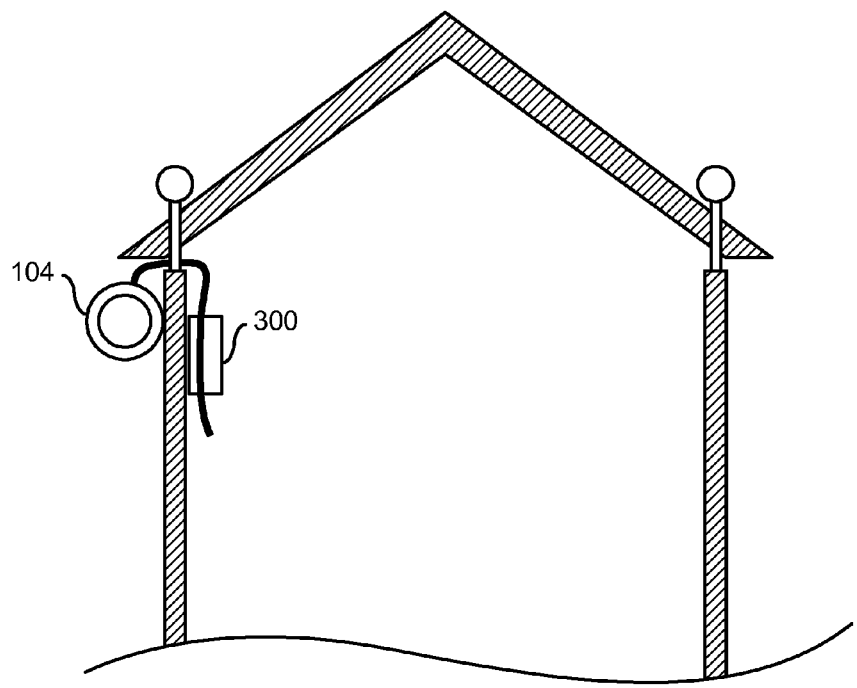
FIG. 12 is a diagram showing an installation on a typical house.

FIGS. 9, 10, and 12 show various novel and effective ways to mount the camera apparatus 50 to an existing outdoor light fixture 302. FIG. 9 shows using a hook and loop fastener 300 to tie the clamp to the side of the light fixture 302. FIG. 10 shows how a power/control connector 150 is inserted into a LED light bulb using an adapter (e.g., as in FIG. 8). A typical implementation of the connector 150 may be implemented as a mini-USB connector. FIG. 12 shows how the hook and loop connectors 300 may be clamped by the lighting fixture 302 to securely mount the camera 100 to the light fixture 302. The clamping action is novel and effective. The light fixture 302 may screw or clamp down the loose ties from the camera apparatus 100.

Figure 11:
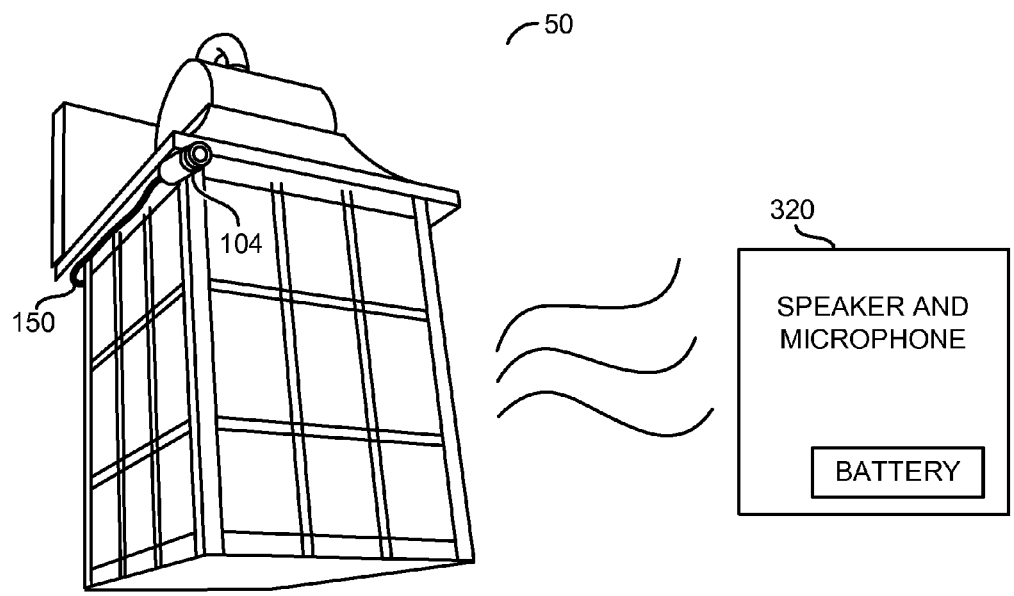
FIG. 11 is a diagram illustrating an outdoor light with the invention installed.

Referring to FIG. 11, a wireless speaker and microphone implementation is shown. A module 320 may wirelessly connect to the module 100. By implementing a wireless module 320 for the intercom, additional placement flexibility may result. FIG. 11 shows a desirable configuration to allow optimal placements of audio communication and video recording/sensing. The example in FIG. 11 shows an indoor video camera configured to look outside of a house through a window (e.g., through the lens sensor 104), and/or wirelessly communicate with a separate outdoor audio intercom powered by batteries. Such an embodiment shows an indoor video and outdoor audio intercom.

Referring to FIG. 12, an alternate installation is shown. A light fixture may screw or clamp down the ties from the camera apparatus by using simple adhesives for easy mounting. For example, the camera module 100 may include a glue tape (e.g., 3M, Scotch, etc.) to attach the light fixture 110 and/or the system 50 to a wall. A connection to the light bulb 102 (or the adapter 240) may be used for power and/or control. The system 50 may be used to control the light bulb 102 in order to eliminate the need for an independent IR light source in the camera during night time by (i) automatically turning on or increasing light intensity of the light bulb 102 when there is insufficient lighting for the camera module 100 to perform, and/or (ii) having an IR light source in the light bulb 102 of the light fixture 110.

The light fixture may screw into a clamp down bracket. A thin tie down may be used to secure a camera. In one example, a velcro-like tie down may be used. Such an implementation is useful when an LED light is integrated into the light fixture 110 and there will be no availability for a replacement of the bulb 102. In addition to the light bulb 102 and/or the light fixture 110, in one example, a separate two-way intercom (speaker and microphone) communicating to the video camera via wireless communication, such as RF or Wi-Fi, may be implemented. Such an implementation may be useful in crime prevention, such as burglaries. The system 50 may be mounted high up under the eaves or with the light fixture, whereas the two-way intercom module may be located at head level and/or near a doorbell.

Figure 13:
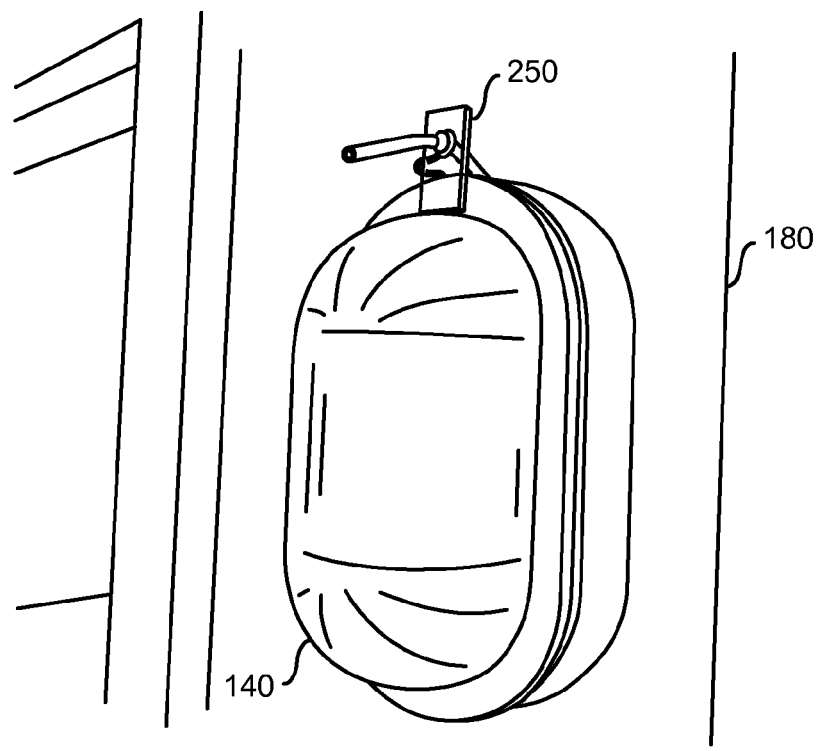
FIG. 13 is a diagram illustrating a side mount installation.

Referring to FIG. 13, a side mount installation is shown. In a flush mounted light fixture, one of the fixture mounting screws may be used to anchor a bracket 250 that may be used to connect the gooseneck camera too.

Figure 14:
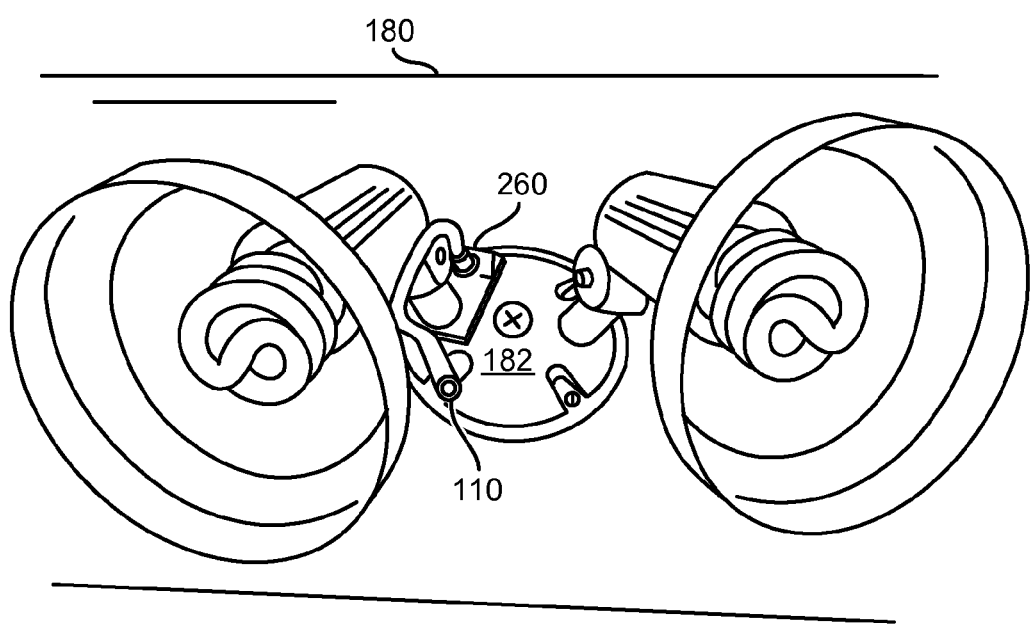
FIG. 14 is a diagram illustrating an installation with a flood light.

Referring to FIG. 14, a flood light type installation is shown. In a spotlight installation, most spotlights have a nut that may be used to position a bracket 260. The bracket 260 may allow positioning of the camera.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an antenna module configured to connect and send data to a network through a wireless connection; and
   a control module configured to provide (i) a physical connection to said antenna module and (ii) a camera sensor to capture pictures of a surrounding environment of said apparatus, wherein (i) said pictures are sent as said data through said wireless connection, (ii) said control module controls turning on a light bulb by controlling a power source to said light bulb, (iii) said control module is fully enclosed within a base of a light fixture and (iv) said antenna module and said camera sensor are located outside of said base of said light fixture.

2. The apparatus according to claim 1, further comprising an interface display configured to allow a user to (i) view said pictures and (ii) send control signals to said control module.

3. The apparatus according to claim 2, wherein said interface display is connected to said wireless connection.

4. The apparatus according to claim 3, wherein said interface display is connected through an Internet Cloud service.

5. The apparatus according to claim 2, wherein said control module is configured to turn said light bulb on or off in response to said control signals from said interface display.

6. The apparatus according to claim 1, wherein said control module is further configured to adjust an intensity and a color of said light bulb.

7. The apparatus according to claim 1, wherein said network comprises at least one of a Wi-Fi wireless network and a bluetooth wireless network.

8. The apparatus according to claim 1, wherein said pictures comprise either still pictures or video.

9. The apparatus according to claim 1, wherein said control module is further configured to (i) provide a first audio signal through a speaker and (ii) receive a second audio signal through a microphone.

10. The apparatus according to claim 1, wherein said apparatus implements an indoor video camera and an outdoor intercom.

11. The apparatus according to claim 1, wherein a lens for said camera sensor is located outside a light shade of said light fixture.

12. The apparatus according to claim 1, wherein said physical connection is implemented as a cable.

13. The apparatus according to claim 12, wherein said cable is rigid and bendable.

14. The apparatus according to claim 12, wherein said cable is a telescopic gooseneck connector.

15. The apparatus according to claim 12, wherein said cable connects to said light fixture using a hook and loop fastener.

16. The apparatus according to claim 1, wherein said physical connection is implemented as a plug connector configured to be removably connected to said light bulb.

17. The apparatus according to claim 1, wherein said plug connector is configured as at least one of a USB connector and a mini-USB connector.

18. The apparatus according to claim 1, wherein said apparatus is configured to be implemented where said light bulb is integrated into said light fixture.

19. The apparatus according to claim 1, wherein said control module is further configured to send alerts to a home owner.

20. The apparatus according to claim 1, wherein said apparatus is configured to support both AC voltage and DC voltage.

* * * * *